(12) United States Patent
Shim et al.

(10) Patent No.: US 8,177,513 B2
(45) Date of Patent: May 15, 2012

(54) METHOD AND APPARATUS FOR A STRUCTURAL OUTLET GUIDE VANE

(75) Inventors: Dong-Jin Shim, Cohoes, NY (US); Scott Finn, Niskayuna, NY (US); Apostolos Pavlos Karafillis, Winchester, MA (US); William Howard Hasting, Cincinnati, OH (US); Arjan Hegeman, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 642 days.

(21) Appl. No.: 12/372,817

(22) Filed: Feb. 18, 2009

(65) Prior Publication Data
US 2010/0209235 A1 Aug. 19, 2010

(51) Int. Cl.
*B63H 1/26* (2006.01)
*B21D 53/78* (2006.01)
(52) U.S. Cl. ............ 416/223 A; 415/191; 415/200; 415/211.2; 29/889.7; 29/889.71; 29/889.72
(58) Field of Classification Search .......... 416/223 A, 416/232, 233, 229 R, 241 A, 241 B; 415/191, 415/200, 211.2; 29/889.7, 889.71, 889.72
See application file for complete search history.

(56) References Cited

U.S. PATENT DOCUMENTS

| | | | |
|---|---|---|---|
| 2,870,959 A * | 1/1959 | Giddings | ............ 416/188 |
| 4,384,607 A | 5/1983 | Wood et al. | |
| 4,594,761 A | 6/1986 | Murphy et al. | |
| 4,832,568 A | 5/1989 | Roth et al. | |
| 6,099,257 A | 8/2000 | Schilling | |
| 6,131,800 A | 10/2000 | Fernihough et al. | |
| 6,197,424 B1 | 3/2001 | Morrison et al. | |
| 6,234,423 B1 | 5/2001 | Hirahara et al. | |
| 6,321,449 B2 | 11/2001 | Zhao et al. | |
| 6,371,725 B1 | 4/2002 | Manteiga et al. | |
| 6,689,246 B2 | 2/2004 | Hirahara et al. | |
| 6,764,276 B2 | 7/2004 | Mulcaire et al. | |

(Continued)

FOREIGN PATENT DOCUMENTS

EP 0813956 B1 8/1998

(Continued)

OTHER PUBLICATIONS

EP10156796 Search Report and Written Opinion, Aug. 12, 2010.

*Primary Examiner* — Michelle Mandala
(74) *Attorney, Agent, or Firm* — Penny A. Clarke (57) ABSTRACT

In one aspect, a method for assembling an outlet guide vane is provided. The method includes providing an outlet guide vane frame having a first side and a second side. The outlet guide vane includes a radially inward flange coupled to a radially outward flange by a leading edge. A trailing edge is coupled to the radially inward flange and the radially outward flange aft of the leading edge. A cavity is defined between the radially inward flange, the radially outward flange, the leading edge, and the trailing edge. A first and a second mating surface circumscribe the cavity on the first and second sides respectively. The method further includes coupling a filler portion within the cavity wherein the filler portion includes a third side and a fourth side, coupling a first skin to the third side and the first mating surface, and coupling a second skin to the fourth side and the second mating surface, wherein at least one of the first skin and the second skin are fabricated from a composite material.

20 Claims, 5 Drawing Sheets

U.S. PATENT DOCUMENTS

| | | |
|---|---|---|
| 6,905,303 B2 | 6/2005 | Liu et al. |
| 7,402,022 B2 | 7/2008 | Harper et al. |
| 2006/0073011 A1* | 4/2006 | Lee et al. .................. 415/191 |
| 2008/0072569 A1 | 3/2008 | Moniz et al. |

FOREIGN PATENT DOCUMENTS

| | | |
|---|---|---|
| EP | 1596036 A1 | 11/2005 |
| EP | 1908920 A2 | 4/2008 |
| EP | 1983160 A2 | 10/2008 |

* cited by examiner

METHOD AND APPARATUS FOR A STRUCTURAL OUTLET GUIDE VANE

BACKGROUND OF THE INVENTION

This invention relates generally to gas turbine engines, and more particularly, to a gas turbine engine vane and a method of fabricating the same.

At least one known gas turbine engine assembly includes a fan assembly that is mounted upstream from a core gas turbine engine. During operation, airflow discharged from the fan assembly is channeled downstream to the core gas turbine engine where the airflow is further compressed. The compressed airflow is then channeled into a combustor, mixed with fuel, and ignited to generate hot combustion gases. The combustion gases are then channeled to a turbine which extracts energy from the combustion gases for powering the compressor, as well as producing useful work to propel an aircraft in flight.

To facilitate channeling the airflow from the fan assembly to the core gas turbine engine, at least one known gas turbine engine assembly includes an outlet guide vane assembly. The outlet guide vane assembly is configured to redirect the circumferentially flowing air discharged from the fan assembly into a substantially axial direction prior to the fan flow being channeled into the core gas turbine engine. In addition to redirecting the fan airflow, the outlet guide vane assembly also provides structural stiffness to the fan frame. More specifically, outlet guide vane assemblies generally include a plurality of outlet guide vanes that are coupled to the fan frame. To provide the necessary structural stiffness the fan frame, the known outlet guide vanes are forged as substantially solid vanes using a metallic material.

However, because some known outlet guide vanes are substantially solid, they increase the overall weight of the gas turbine engine assembly, and may also cause a reduction in fuel efficiency. Other known guide vanes have attempted to use a lighter filler material surrounded by a metallic portion but while lighter, these vanes are still too heavy.

BRIEF SUMMARY OF THE INVENTION

In one aspect, a method for assembling an outlet guide vane includes providing an outlet guide vane frame having a first side and a second side. The outlet guide vane includes a radially inward flange coupled to a radially outward flange by a leading edge. A trailing edge is coupled to the radially inward flange and the radially outward flange aft of the leading edge. A cavity is defined between the radially inward flange, the radially outward flange, the leading edge, and the trailing edge. A first and a second mating surface circumscribe the cavity on the first and second sides respectively. The method further includes coupling a filler portion within the cavity wherein the filler portion includes a third side and a fourth side, coupling a first skin to the third side and the first mating surface, and coupling a second skin to the fourth side and the second mating surface, wherein at least one of the first skin and the second skin are fabricated from a composite material.

In another aspect, an outlet guide vane for a gas turbine engine includes a first flange, a second flange positioned radially outwardly from the first flange, an airfoil extending between the first and second flanges and coupled thereto. The airfoil comprises a leading edge portion and a trailing edge portion. The leading edge portion and the trailing edge portion are fabricated from a first material. A filler portion is coupled in a gap formed by the leading edge portion and the trailing edge portion. The filler portion comprises a first side and a second side and is fabricated from a second material different from the first material. A first skin is coupled to the first side and a second skin is coupled to the second side. The first and second skins are fabricated from a composite material.

In a further aspect, a gas turbine engine assembly includes a core gas turbine engine, a fan assembly disposed upstream from the core gas turbine engine, and an outlet guide vane assembly including a plurality of outlet guide vanes. The outlet guide vane assembly is positioned downstream from the fan assembly. At least one of the plurality of outlet guide vanes includes, an airfoil including a leading edge structure and a trailing edge structure each fabricated from a first material, a filler portion having a first side and a second side wherein the filler portion is positioned between the leading and trailing edge portions and fabricated from a second material that is different than the first material. The airfoil further includes a first skin coupled to the first side and a second skin coupled to the second side. The first and second skins are fabricated from a composite material.

BRIEF DESCRIPTION OF THE DRAWING

FIGS. 1-5 show exemplary embodiments of the method and apparatus described herein.

DETAILED DESCRIPTION OF THE INVENTION

Figure 1:
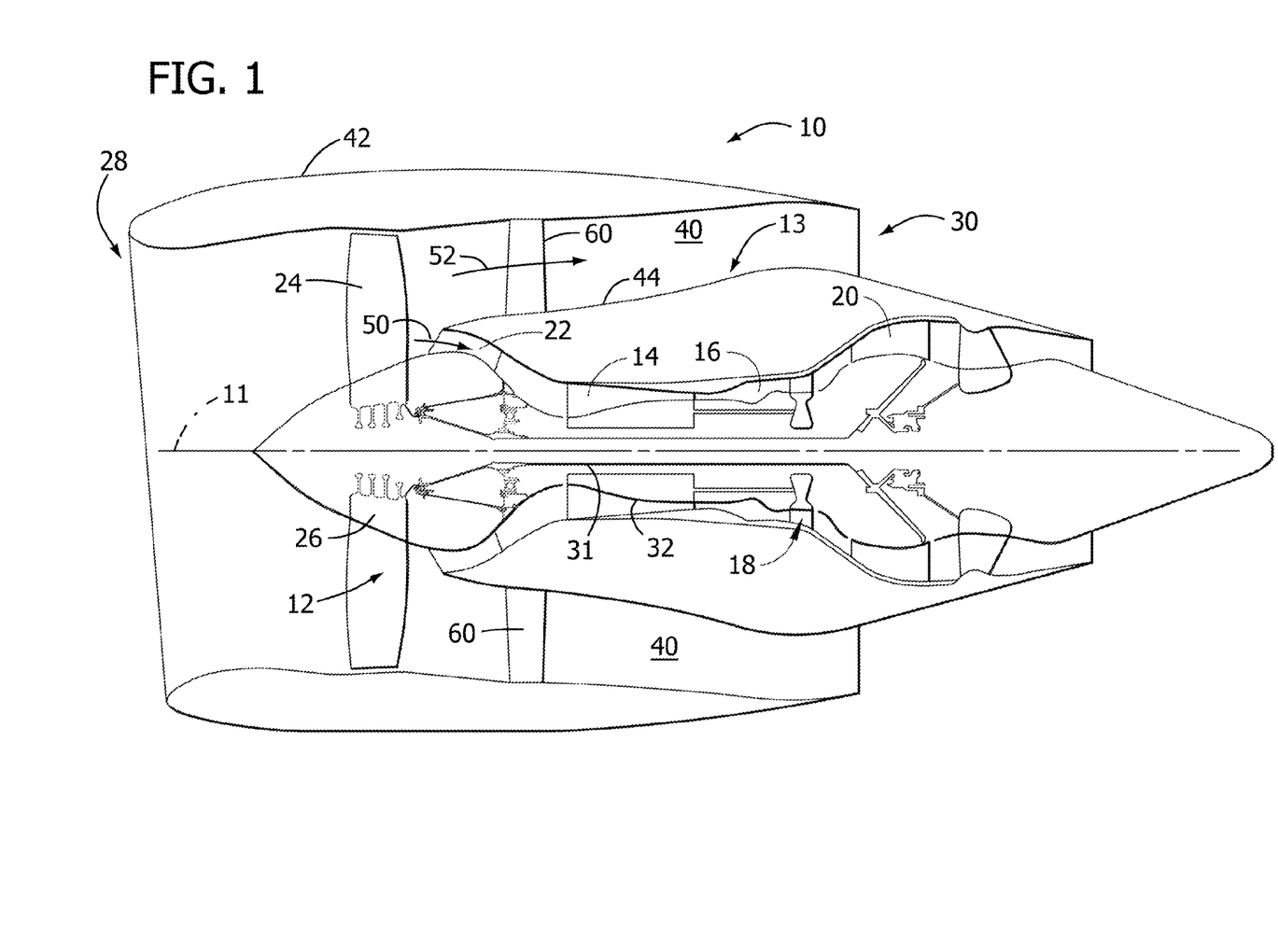
FIG. 1 is a schematic illustration of an exemplary gas turbine engine assembly.

FIG. 1 is a schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high pressure compressor 14, a combustor 16, and a high pressure turbine 18. In the exemplary embodiment, gas turbine engine assembly 10 also includes a low pressure turbine 20, and a multi-stage booster compressor 22.

Fan assembly 12 includes an array of fan blades 24 extending radially outward from a rotor disk 26. Gas turbine engine assembly 10 has an intake side 28 and an exhaust side 30. Fan assembly 12, booster 22, and turbine 20 are coupled together by a first rotor shaft 31, and compressor 14 and turbine 18 are coupled together by a second rotor shaft 32.

In operation, air flows through fan assembly 12 and a first portion of the airflow is channeled through booster 22. The compressed air that is discharged from booster 22 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

A second portion of the airflow discharged from fan assembly 12 is channeled through a bypass duct 40 to bypass a portion of the airflow from fan assembly 12 around core gas turbine engine 13. More specifically, bypass duct 40 extends between a fan casing or shroud 42 and splitter 44. Accordingly, a first portion 50 of the airflow from fan assembly 12 is channeled through booster 22 and then into compressor 14 as described above and a second portion 52 of the airflow from fan assembly 12 is channeled through bypass duct 40 to provide thrust for an aircraft, for example. Gas turbine engine assembly 10 also includes a fan frame assembly 60 to provide structural support for fan assembly 12 and is also utilized to coupled fan assembly 12 to core gas turbine engine 13.

Figure 2:
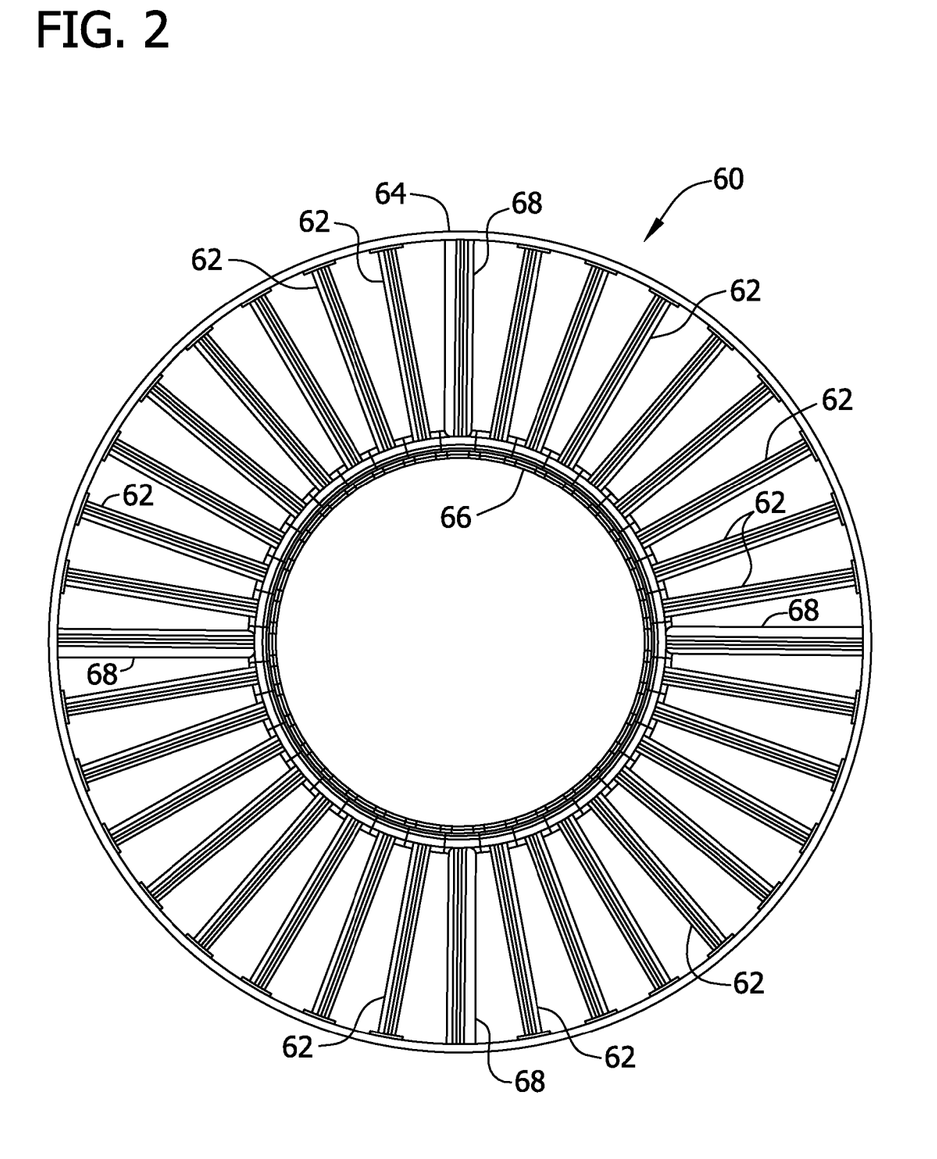
FIG. 2 is a perspective view of a fan frame assembly that includes a plurality of outlet guide vanes that may be utilized with the gas turbine engine assembly shown in FIG. 1.

FIG. 2 is a front perspective view of fan frame assembly 60. Fan frame assembly 60 includes a plurality of outlet guide vanes 62 that extend substantially radially between a radially outward mounting flange 64 and a radially inward mounting flange 66 and are circumferentially-spaced around within bypass duct 40. Fan frame assembly 60 also includes a plurality of struts 68 that are coupled between radially outward mounting flange 64 and radially inward mounting flange 66. In one embodiment, fan frame assembly 60 is fabricated in arcuate segments in which flanges 64 and 66 are coupled to outlet guide vanes 62 and struts 68. In the exemplary embodiment, outlet guide vanes 62 and struts 68 are coupled coaxially within bypass duct 40. Specifically, outlet guide vanes 62 and struts 68 each coupled between flanges 64 and 66 in the same axial location as shown in FIG. 2. Optionally, outlet guide vanes 62 may be coupled downstream from struts 68 within bypass duct 40.

Fan frame assembly 60 is one of the various frame and support assemblies of gas turbine engine assembly 10 that are used to facilitate maintaining an orientation of various components within gas turbine engine assembly 10. More specifically, such frame and support assemblies interconnect stationary components and provide rotor bearing supports. Fan frame assembly 60 is coupled downstream from fan assembly 12 within bypass duct 40 such that outlet guide vanes 62 and struts 68 are circumferentially-spaced around the outlet of fan assembly 12 and extend across the airflow path discharged from fan assembly 12.

Figure 3:
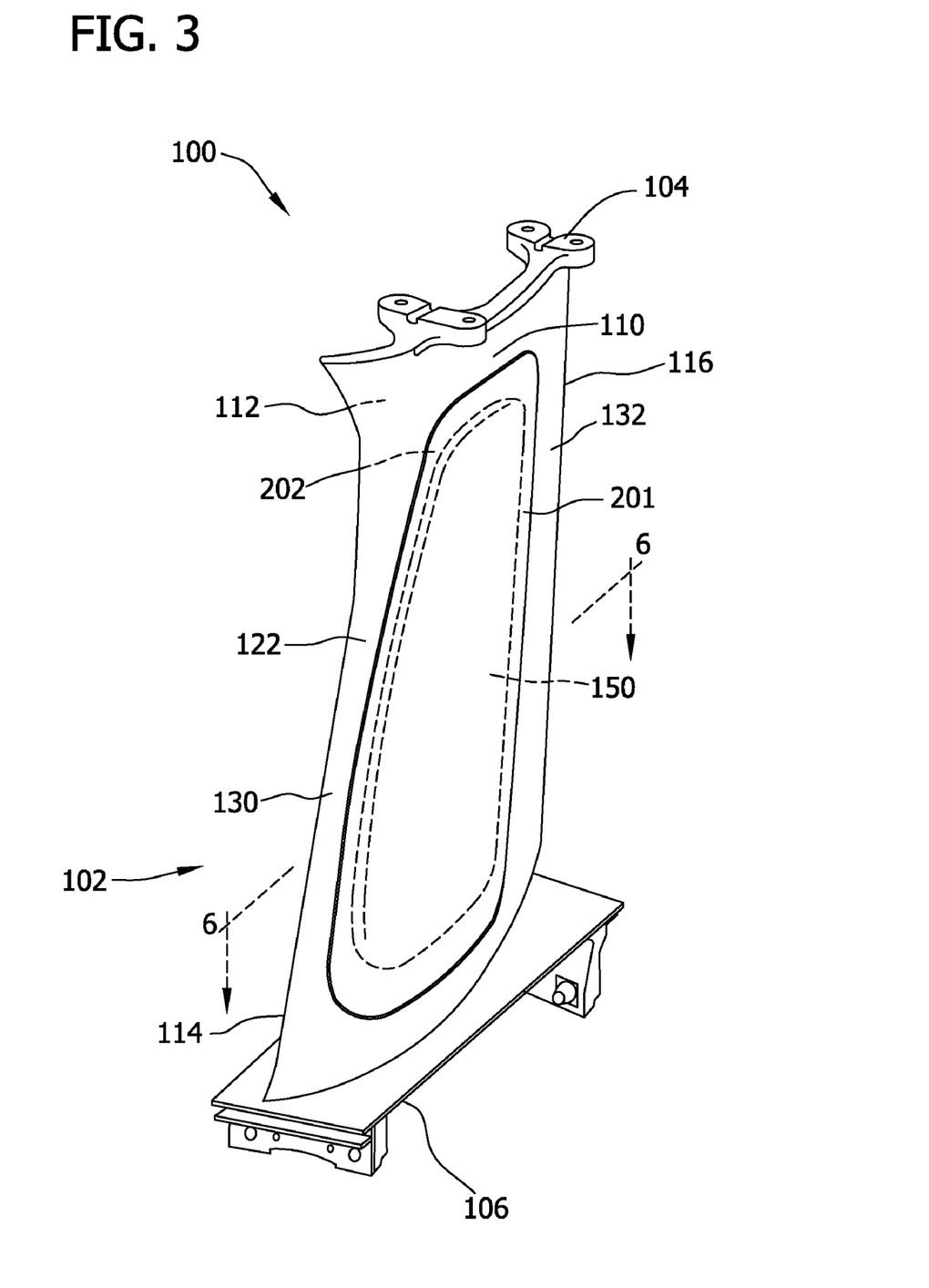
FIG. 3 is a perspective view of an outlet guide vane that may be used with the fan frame assembly shown in FIG. 2.

In the exemplary embodiment, outlet guide vane 100 includes an airfoil 102 that is coupled between a radially outward flange 104 and a radially inward flange 106. In the exemplary embodiment, airfoil 102, radially outward flange 104, and radially inward flange 106 are cast or forged as a unitary outlet guide vane 100. Optionally, radially outward flange 104 and radially inward flange 106 may be coupled to airfoil 102 using a welding or brazing technique, for example. Although in the exemplary embodiment radially outward and radially inward flanges 104 and 106 are fabricated from metal, in other embodiments radially outward and radially inward flanges 104 and 106 may be fabricated from a composite material. In still other embodiments, airfoil 102 may be fabricated partially or entirely from a composite material and may have a metallic strengthener attached to it.

Airfoil 102 includes a first sidewall 110 and a second sidewall 112. In one embodiment, either first and/or second sidewalls 110 and/or 112 may be contoured to improve aerodynamic performance. In the exemplary embodiment, first sidewall 110 is convex and defines a suction side of airfoil 102, and second sidewall 112 is concave and defines a pressure side of airfoil 102. Sidewalls 110 and 112 are joined at a leading edge 114 and at an axially-spaced trailing edge 116 of airfoil 102. More specifically, airfoil trailing edge 116 is spaced chordwise and downstream from airfoil leading edge 114. First and second sidewalls 110 and 112, respectively, extend longitudinally or radially outward in span from radially inner flange 106 to radially outer flange 104. In the exemplary embodiment, at least a portion of outlet guide vane 100 is fabricated utilizing a metallic material such as, but not limited to, titanium, aluminum, and/or a Metal Matrix Composite (MMC) material.

As shown in FIG. 3, airfoil 102 includes a first assembly surface 120, a second assembly surface 121, a leading edge portion or spar 130 and a trailing edge portion or spar 132. More specifically, airfoil 102 has a profile that tapers outwardly from leading edge 114 at least partially towards trailing edge 116 and also tapers outwardly from trailing edge 116 at least partially towards leading edge 114. The profile then tapers inwardly from the leading edge portion 130 and from trailing edge portion 132 to define first and second assembly surfaces 120 and 121. The profile then tapers further inwardly to form a cavity 140 circumscribed by first assembly surface 120 on one side of the airfoil and circumscribed by second assembly surface 121 on the other side of the airfoil.

Figure 4:
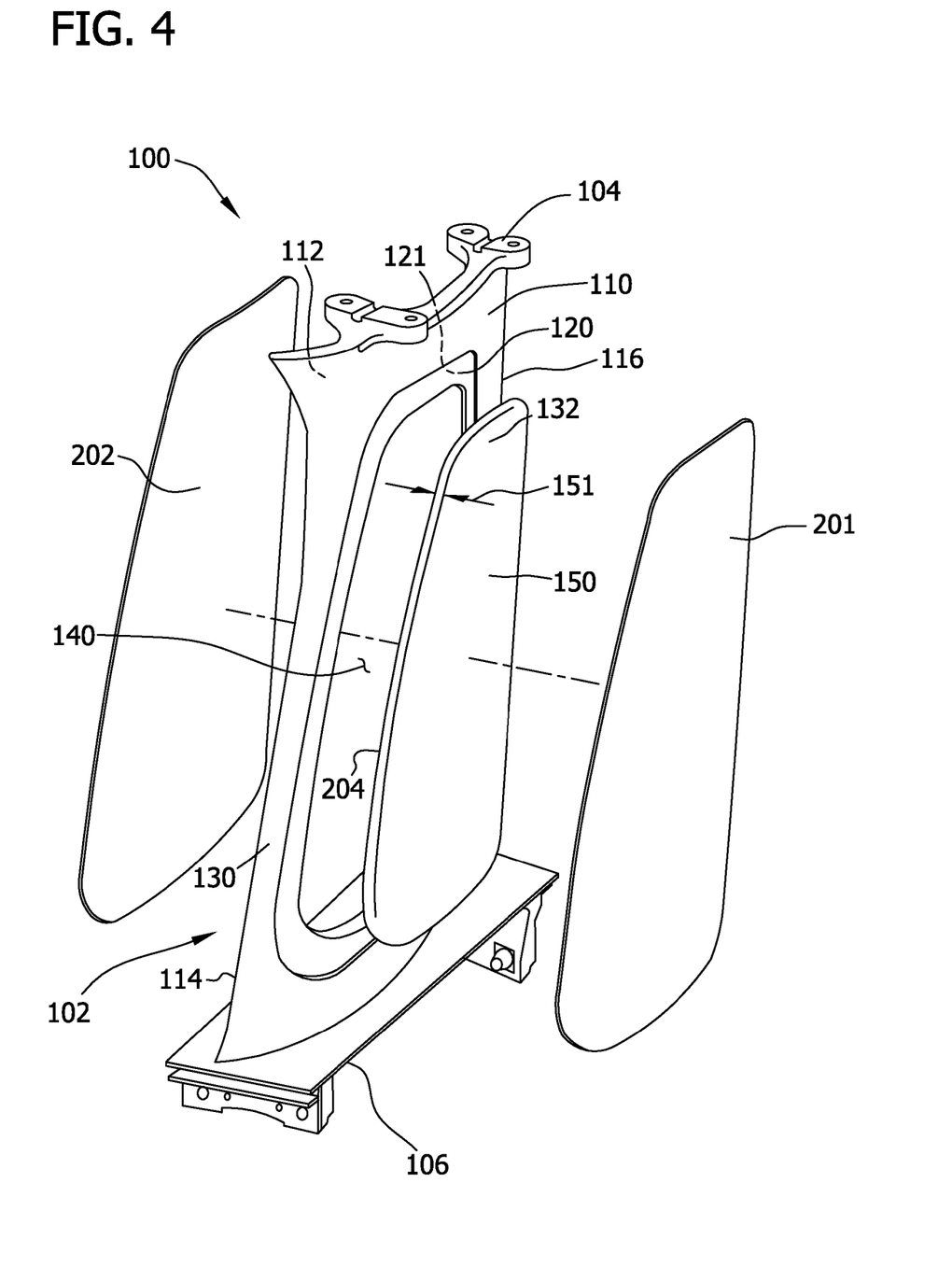
FIG. 4 is an exploded view of the outlet guide vane of FIG. 3.
Figure 5:
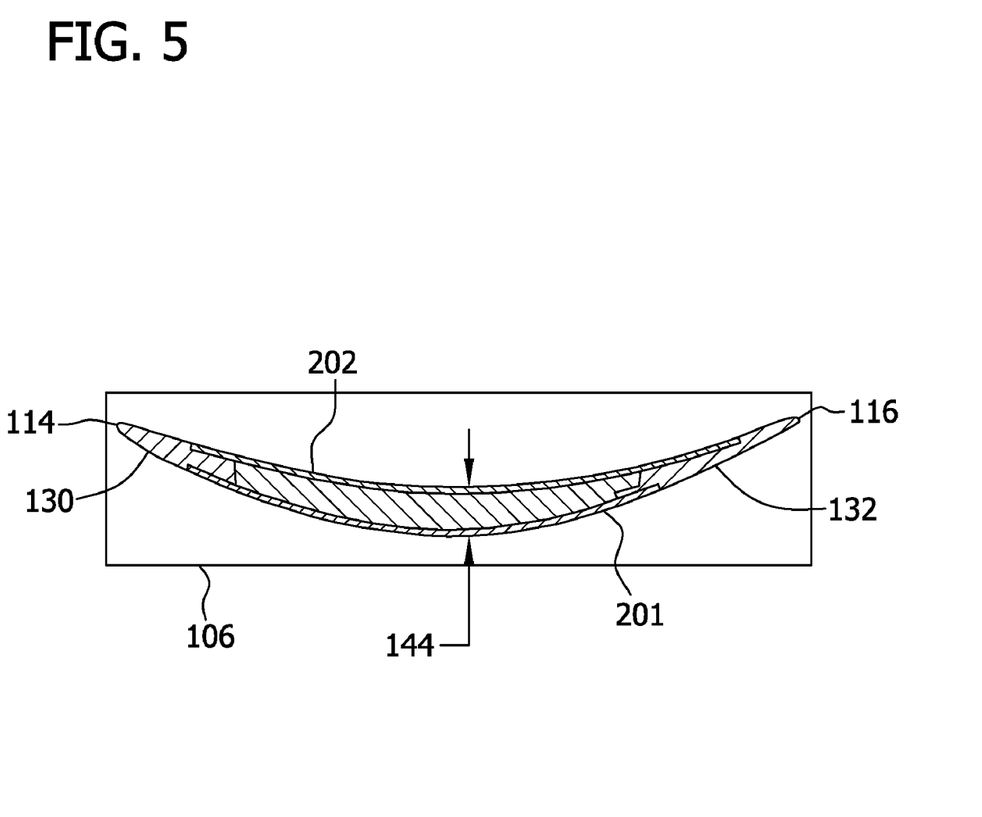
FIG. 5 is a cross-sectional view of the outlet guide vane shown in FIG. 3.

In the exemplary embodiment, cavity 140 is sized to receive a filler 150 comprising a first side 203 and a second side 204 that is a honeycombed material. That is, filler 150 has a thickness 151 that is smaller than the thickness 144 of cavity 140 such that filler 150 is not flush with a leading edge portion 130 and/or trailing edge portion 132 when positioned within cavity 140. Two laminate portions 201 and 202 are sized to overlay the filler 150 between leading edge portion 130 and trailing edge portion 132. Laminate portion 201 is coupled to first side 203 and first assembly surface 120 such that laminate portion 201 is substantially flush with both leading edge portion 130 and trailing edge portion 132 and laminate portion 202 is coupled to second side 204 and second assembly surface 121 such that laminate portion 202 is also substantially flush with both leading edge portion 130 and trailing edge portion 132. In some embodiments, a protective coating 122, such as polyurethane, may be applied to the outlet guide vane 100.

During fabrication, of outlet guide vane 100, outlet guide vane 100 is cast or forged to include leading edge portion 130, trailing edge portion 132, and inward and outward flange 104 and 106. Filler 150 is then coupled within cavity 140 as described above. Then a laminate portion 201 is coupled to first side 203 and laminate portion 202 is coupled to second side 204.

Described herein, is a gas turbine engine wherein at least some known outlet guide vanes are replaced with an outlet guide vane having a substantially hollow interior portion filled with a relatively lightweight material sandwiched between two laminate sheets. As such, the exemplary outlet guide vanes described herein reduce the overall weight of the gas turbine engine assembly while still maintaining structural integrity thus achieving the very challenging engine weight goals for new applications.

More specifically, the outlet guide vane 100 described herein includes two spars that form the airfoil portion of the outlet guide vane 100. The area between the spars is filled with a honeycombed material to add rigidity to the airfoil, and then sandwiched between two laminate sheets.

This written description uses examples to disclose the invention, including the best mode, and also to enable an person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assembling an outlet guide vane, said method comprising:
   providing an outlet guide vane frame having a first side and a second side, the outlet guide vane comprising:
   a radially inward flange coupled to a radially outward flange by a leading edge;
   a trailing edge coupled to the radially inward flange and the radially outward flange aft of the leading edge;
   a cavity defined between the radially inward flange, the radially outward flange, the leading edge, and the trailing edge; and
   a first and a second assembly surface circumscribing the cavity on the first and second side respectively,
   wherein the outlet guide vane includes a profile that tapers outwardly from the leading edge at least partially to the trailing edge to define a leading edge portion and tapers outwardly from the trailing edge at least partially towards the leading edge to define a trailing edge portion and then tapers inwardly from the leading edge portion and from the trailing edge portion to define the first and second assembly surfaces, and wherein the profile tapers further inwardly to form the cavity;
   coupling a filler portion within the cavity, the filler portion including a third side and a fourth side;
   coupling a first skin to the third side and the first assembly surface, wherein the first skin is sized to overlay the filler portion and the first assembly surface, extending between the leading edge portion and the trailing edge portion and is configured substantially flush with the leading edge portion and the trailing edge portion; and
   coupling a second skin to the fourth side and the second assembly surface, wherein the second skin is sized to overlay the filler portion and the second assembly surface, extending between the leading edge portion and the trailing edge portion and is configured substantially flush with the leading edge portion and the trailing edge portion,
   wherein at least one of the first skin and the second skin are fabricated from a composite material.

2. A method in accordance with claim 1, wherein providing the outlet guide vane frame comprises providing an outlet guide vane frame comprising a metallic material.

3. A method in accordance with claim 1, wherein providing the outlet guide vane frame comprises providing an outlet guide vane frame comprising a composite material.

4. A method in accordance with claim 1, further comprising applying a protective coating to the outlet guide vane.

5. A method in accordance with claim 1, wherein coupling the filler portion comprises coupling a filler portion comprising a honeycomb material.

6. A method in accordance with claim 1, wherein providing the outlet guide vane frame comprises providing an outlet guide vane frame comprising a separable assembly.

7. A method in accordance with claim 1, wherein providing the outlet guide vane frame comprises providing an outlet guide vane frame comprising aluminum.

8. An outlet guide vane for a gas turbine engine, said outlet guide vane having a first side and a second side and comprising:
   a first flange;
   a second flange positioned radially outwardly from said first flange;
   an airfoil extending between said first and second flanges and coupled thereto, the airfoil comprising a leading edge portion and a trailing edge portion, said leading edge portion and said trailing edge portion fabricated from a first material;
   a cavity defined between the radially inward flange, the radially outward flange, the Leading edge portion and the trailing edge portion;
   a first and a second assembly surface circumscribing the cavity on the first and second side respectively,
   wherein the outlet guide vane includes a profile that tapers inwardly from the leading edge portion and from the trailing edge portion to define the first and second assembly surfaces, and wherein the profile tapers further inwardly to form the cavity;
   a filler portion coupled in the cavity formed by the leading edge portion and the trailing edge portion, the filler portion comprising a first side and a second side, the filler portion fabricated from a second material, said second material different from said first material;
   a first skin coupled to the first side of the filler portion and the first assembly surface, wherein the first skin is sized to overlay the filler portion and the first assembly surface, extending between the leading edge portion and the trailing edge portion and is configured substantially flush with the leading edge portion and the trailing edge portion, the first skin fabricated from a composite material; and
   a second skin coupled to the second side of the filler portion and the second assembly surface, wherein the second skin is sized to overlay the filler portion and the second assembly surface, extending between the leading edge portion and the trailing edge portion and is configured substantially flush with the leading edge portion and the trailing edge portion, the second skin fabricated from a composite material.

9. An outlet guide vane in accordance with claim 8, wherein said first material comprises a metallic material and said second material comprises a honeycomb material.

10. An outlet guide vane in accordance with claim 8, wherein at least one of the radially inward flange, the radially outward flange, and the airfoil comprises a composite material.

11. An outlet guide vane in accordance with claim 8, wherein the first material is aluminum.

12. An outlet guide vane in accordance with claim 8 further comprising a protective coating applied to the outlet guide vane.

13. An outlet guide vane in accordance with claim 8 wherein said first flange, said second flange, and said airfoil comprise at least one of a cast unitary outlet guide vane and a forged unitary outlet guide vane.

14. A gas turbine engine assembly comprising:
   a core gas turbine engine;
   a fan assembly disposed upstream from said core gas turbine engine, said fan assembly comprising a plurality of fan blades; and
   an outlet guide vane assembly comprising a plurality of outlet guide vanes, said outlet guide vane assembly positioned downstream from said fan assembly, at least one of said plurality of outlet guide vanes having a first side and a second side and comprising:
   an airfoil comprising a leading edge structure and a trailing edge structure each fabricated from a first material;
   a cavity defined between the leading edge structure and the trailing edge structure;

a first and a second assembly surface circumscribing the cavity on the first and second side respectively of the outlet guide vane, wherein the outlet guide vane includes a profile that tapers outwardly from the leading edge structure at least partially to the trailing edge structure to define a leading edge portion and tapers outwardly from the trailing edge structure at least partially towards the leading edge structure to define a trailing edge portion and then tapers inwardly from the leading edge portion and from the trailing edge portion to define the first and second assembly surfaces, and wherein the profile tapers further inwardly to form the cavity;

a filler portion comprising a first side and a second side, said filler portion positioned between the leading and trailing edge portions, the filler portion fabricated from a second material that is different than the first material;

a first skin coupled to the first side of the filler portion and the first assembly surface, wherein the first skin is sized to overlay the filler portion and the first assembly surface, extending between the leading edge portion and the trailing edge portion and is configured substantially flush with the leading edge portion and the trailing edge portion, the first skin fabricated from a composite material; and a second skin coupled to the second side of the filler portion and the second assembly surface, wherein the second skin is sized to overlay the filler portion and the second assembly surface, extending between the leading edge portion and the trailing edge portion and is configured substantially flush with the leading edge portion and the trailing edge portion, the second skin fabricated from a composite material.

15. A gas turbine engine assembly in accordance with claim 14, wherein said airfoil further comprises a separable assembly.

16. A gas turbine engine assembly in accordance with claim 14, wherein the first material comprises a metallic material and the second material comprises a honeycomb material.

17. A gas turbine engine assembly in accordance with claim 14, wherein at least a portion of the airfoil is fabricated from a composite material.

18. A gas turbine engine assembly in accordance with claim 14 wherein the first material is aluminum.

19. A gas turbine engine assembly in accordance with claim 14 further comprising a protective coating applied to an interface between at least one of the first skin and the first side and the second skin and the second side.

20. A gas turbine engine assembly in accordance with claim 19 wherein the protective coating comprises a polyurethane.

\* \* \* \* \*